July 26, 1966 R. WALKER 3,263,038

AUTOMATIC SWITCH MEANS FOR A MAGNETIC TAPE RECORDER

Filed Oct. 6, 1964 3 Sheets-Sheet 1

INVENTOR
RONALD WALKER
BY Kurt Kelman
AGENT

July 26, 1966 R. WALKER 3,263,038

AUTOMATIC SWITCH MEANS FOR A MAGNETIC TAPE RECORDER

Filed Oct. 6, 1964 3 Sheets-Sheet 2

INVENTOR
RONALD WALKER
BY Kurt Kelman
AGENT

July 26, 1966 R. WALKER 3,263,038

AUTOMATIC SWITCH MEANS FOR A MAGNETIC TAPE RECORDER

Filed Oct. 6, 1964 3 Sheets-Sheet 3

INVENTOR
RONALD WALKER
BY Kurt Kelman
AGENT

United States Patent Office 3,263,038

Patented July 26, 1966

3,263,038

AUTOMATIC SWITCH MEANS FOR A MAGNETIC TAPE RECORDER

Ronald Walker, Norton, Stourbridge, England, assignor to BSR Limited, Stafford, England, a British company Filed Oct. 6, 1964, Ser. No. 402,026
Claims priority, application Great Britain, Oct. 10, 1963, 39,921/63
2 Claims. (Cl. 200—61.13)

This invention relates to sound recording and playback apparatus utilising magnetic tape and of the type now commonly known as "tape-recorders" wherein the tape is passed from one to another of two rotatable spools and past an assembly of transducer and erasure heads.

Hitherto it has been the practice in tape-recorders of this type (hereinafter referred to as the type specified) to have a separate "on" "off" control for the motor independent of the manual controls on the tape-recorder deck for starting and stopping the operations of the tape-recorder, which means that the motor is left running when the tape becomes exhausted from the spool or if the tape accidentally breaks, and if the apparatus is unattended complications or damage may result.

The object of the invention is to provide automatic means for switching off the motor in the event of the tape being exhausted or accidentally broken.

According to the invention there is provided a tape recorder of the type specified wherein there is arranged in the electrical circuit of the motor a separate and independent control switch which is actuated by a pivoted arm having a portion adapted to pass through an opening in a fixed plate under spring pressure to cause actuation of the switch and to cut-off supply of current to the driving motor, the tape, during normal operation of the apparatus, being arranged to pass across said opening to bar passage of said portion of the lever.

Preferably the control switch is of the type having spring-operated contacts and the spring means of the switch may be utilised to provide the required spring pressure on the lever.

The aforesaid fixed plate has a narrow slot which is just wide enough to allow passage of a finger on the end of the pivoted arm and also preferably the manual stop control on the tape deck is adapted to be coupled to said pivoted arm in such a manner that operation of the stop control causes movement of the finger back through said slot after automatic stopping of the driving motor. The finger may have an inclined nose which remains projecting through the slot after automatic stopping so that as the tape is replaced it will engage the nose and move the finger back through the slot.

Heretofore, and for the remainder of this specification, the apparatus is described as though the tape-recorder were occupying a normal position on a horizontal surface with the spindles of the spool carriers in vertical positions, but this is only for the purposes of clarity in the description as it is a feature of the apparatus described hereinafter that such apparatus is capable of functioning with the tape deck set at an angle to the horizontal plane or with the tape deck in a vertical plane, in which latter case the spindles of the spool carriers would be horizontal.

An embodiment of the invention is hereinafter described with reference to the accompanying drawings by way of example and it may be applied to a tape-recorder having an arrangement of spool carriers and drive according to our co-pending application No. 402,025 of even date herewith, and also a speed control and braking arrangement for the spools in accordance with my further co-pending applications No. 402,029 and No. 402,027 of even date herewith.

Figure 1:
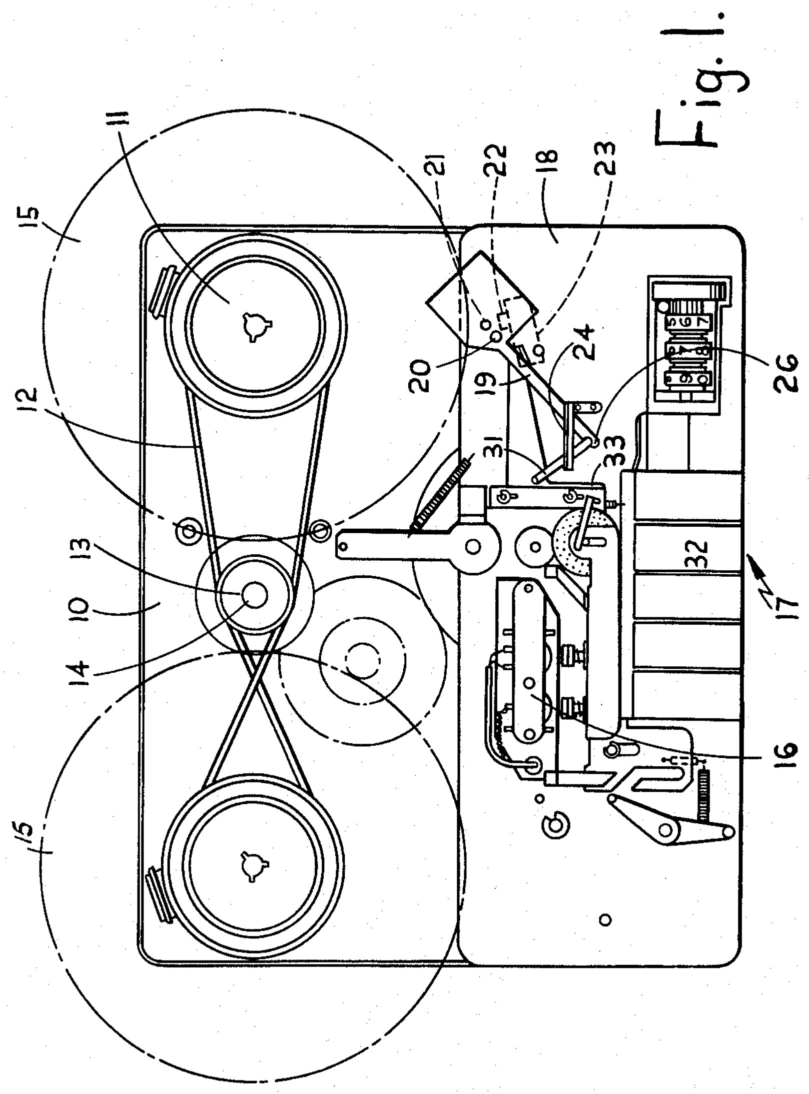
FIGURE 1 is a plan view of the tape recorder.

In the drawings and following description reference is made only to those parts necessary for an understanding of the invention and for a complete description of a tape-recorder reference should be made to the copending applications referred to above.

With reference to FIGURE 1, the tape recorder comprises, briefly, a tape deck or mounting plate 10, upon which are mounted the spool carriers 11 driven by belt 12 from a pulley 13 on the spindle 14 of the driving motor, the tape being transported between the spools 15, past the transducer heads 16. At the front there is a bank 17 of control finger levers.

The assembly of transducer heads 16 is mounted upon a mounting plate 18 spaced above the tape-deck, and to one side of the assembly of transducer heads there is provided the automatic switch-off assembly hereinafter described. This assembly comprises an arm 19 pivoted upon the mounted plate 18 about a vertical axis 20 and having a downwardly projecting peg 21 which at its lower end engages the operating member 22 projecting from a control switch 23 mounted underneath the mounting plate 18 and connected to the circuit of the driving motor.

On the upper side of the mounting plate 18 there is fixed a vertically extending plate 24 having a narrow vertical slot 25 therein which acts as a gate for a finger 26 fixed to the outer end of the pivoted arm 19, and this plate is arranged approximately in line with the assembly of transducer heads 16 so that the tape 27, after passing through the transducer heads and between the normal capstan spindle 28 and pinch roller 29, is trained by a guide 30 to pass across the forward face of this plate 24 and, therefore, across the forward face of the aforesaid slot or gate 25 in the plate 24.

Figure 2:
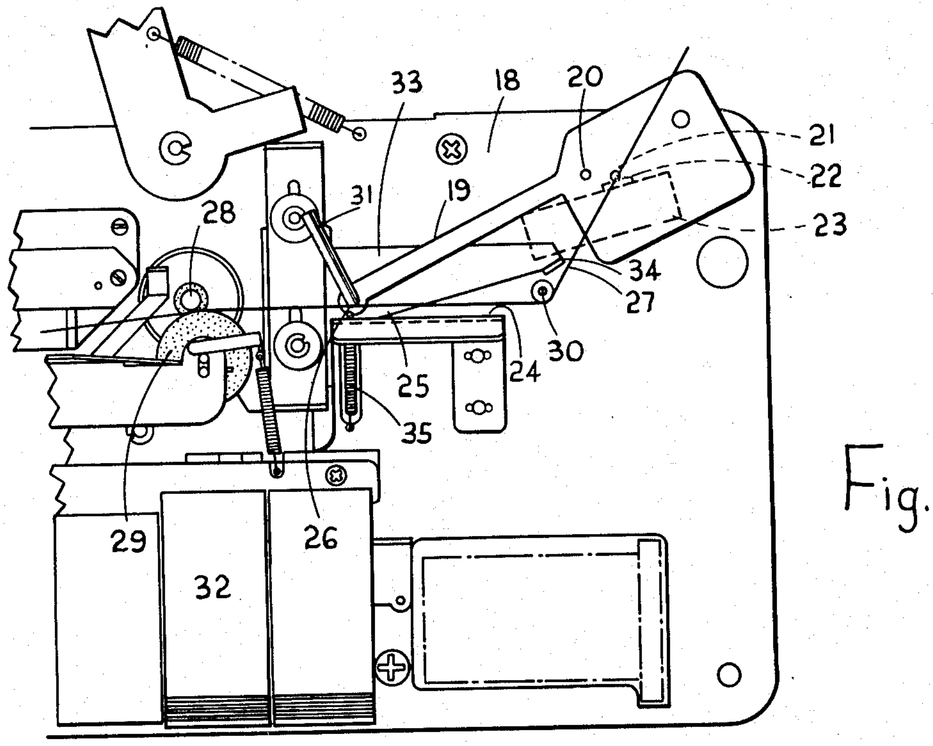
FIGURE 2 is a fragmentary plan view on an enlarged scale showing the details of the automatic switch-off arrangement in the normal operating position.
Figure 3:
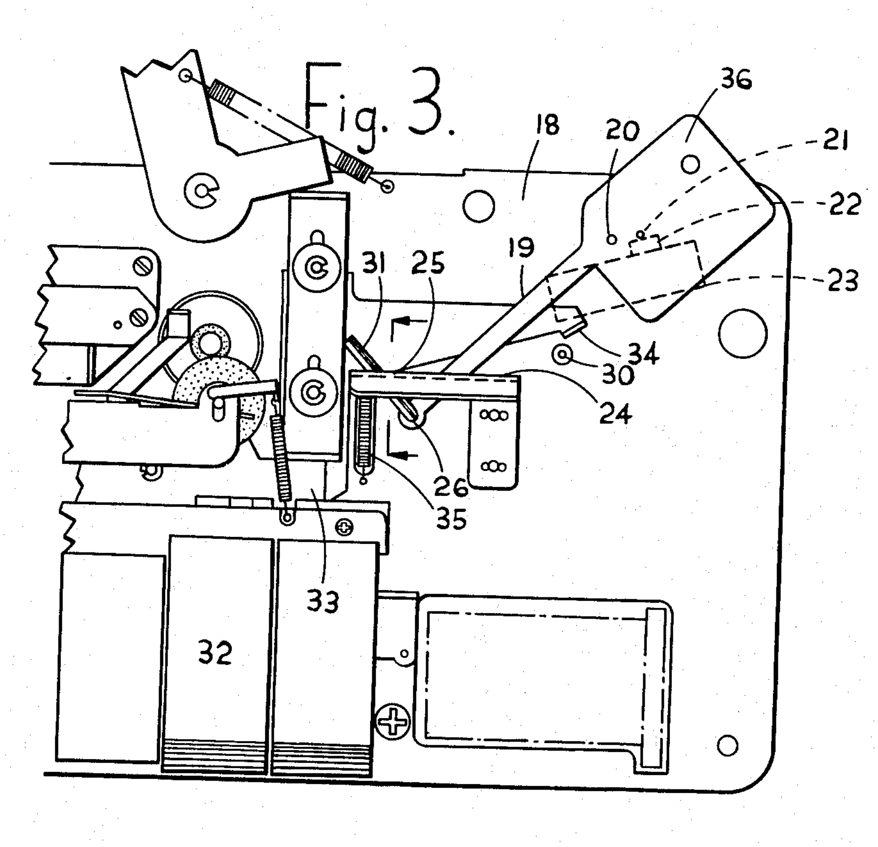
FIGURE 3 is a view similar to FIGURE 2 but showing the parts after automatic switching-off has taken place.

The finger 26 on the end of the pivoted arm 19 has its upper end 31 bent forwardly and upwardly. When the tape is in its normal position (FIG. 2) it bars the gate 25 through the plate 24 and prevents the finger 26 from moving through this gate. The normal contact-actuating spring inside the control switch 23 pushes its actuating member 22 outwardly so as to engage the depending peg 21 of the pivoted arm and tends to swing the arm in such a direction as to cause the finger 26 on the end of the arm to move through the gate 25, its passage being normally barred by the presence of the tape.

However, in event of the tape being exhausted or broken the trailing or broken end of the tape will pass the gate 25, thus allowing the finger 26 on the end of the arm 19 to move through the gate and in so doing allowing the spring means of the switch to operate the contacts and interrupt the circuit to the driving motor, as the peg 21 moves away from the switch actuating member 22.

The normal stop finger lever 32 on the tape-deck has a downwardly projecting lug (not shown) which is arranged to engage a sliding plate 33 mounted on the upper side of the mounting plate, and this sliding plate has an upwardly projecting lug 34 which engages the pivoted arm 19 so that when the stop finger lever is depressed and the sliding plate 33 is moved towards the back of the tape deck the lug 34 on this sliding plate moves the arm 19 in a direction to move the finger 26 back through the gate 25 and provide clearance between the finger and the plate 24 to allow the tape to be reinserted. This sliding plate is normally spring urged by a coil spring 35 in the direction towards the front edge of the tape-deck so that during normal operation the lug 34 is out of engagement with the pivoted arm 19.

Figure 4:
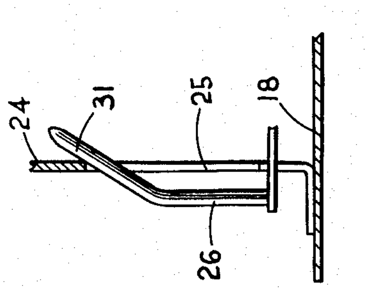
FIGURE 4 is a detail elevation of part of the apparatus.

The upper end 31 of the finger, as previously mentioned, is bent forwardly and upwardly to provide an inclined nose so that after automatic stopping has taken place and the finger 26 is passed through the gate there is still the nose 31 of this finger projecting forwardly through the gate, because it engages the top of the slot 25 (see FIGURE 4). Thus the tape can be reinserted and in passing vertically downwards will engage the nose and move the finger back through the slot to switch on again. Thus if the stop control should not be fully depressed, to cause return of the finger, the reinsertion of the tape will do this.

On the side of its pivotal axis remote from the finger the end of the pivoted arm 17 is substantially enlarged to form a counter-balance weight 36 which comes into action if the tape deck is operated in an upright or vertical plane, whereby, in such a position, the arm is balanced about its pivot and only the spring pressure of the switch 23 influences the arm.

What I claim is:

1. In a tape recorder having a magnetic tape, an assembly of transducer and eraser heads, means for moving the tape longitudinally across said assembly of heads, an electric driving motor for driving said tape moving means and manually operable switch means for switching off said motor; the provision for automatic means for switching off said motor independently of said manually operable switch means, said automatic means comprising, an electric switch to break the circuit to the electric motor, a fixed plate, said plate having a narrow slot formed therein, a pivoted arm, spring means acting on said pivoted arm to urge the same towards the fixed plate, a finger arranged on said pivoted arm to pass through the slot in the fixed plate to actuate said electric switch to switch off the electric motor when said arm is pivoted by said spring means; the tape, during normal operation of the apparatus, being passed across said slot in said plate to prevent passage of said finger therethrough, said manual switch means including means for moving said finger out of said slot after automatic stopping of said electric motor.

2. The apparatus claimed in claim 1 wherein the manual switch means comprises a pivoted manually operable lever, a projection provided on said lever, a slideable plate, the projection engaging the slideable plate, a lug provided on the slideable plate, said lug engaging with the pivoted arm when the said manually operable lever is depressed, to move the pivoted arm in the direction to move the finger back through the slot in the fixed plate.

References Cited by the Examiner

UNITED STATES PATENTS 3,069,570 12/1962 Abadie -------- 200—61.13 X

BERNARD A. GILHEANY, *Primary Examiner.*

R. N. ENVALL, Jr., *Assistant Examiner.*